US005684493A

United States Patent [19]

Floyd et al.

[11] Patent Number: 5,684,493

[45] Date of Patent: Nov. 4, 1997

[54] SUPPORT BASE FOR SUBMARINE ANTENNA MAST

[75] Inventors: Thomas R. Floyd; David M. Fedeli, both of Waterford, Conn.

[73] Assignee: The United States of America as represented by the Secretary of the Navy, Washington, D.C.

[21] Appl. No.: 655,102

[22] Filed: May 29, 1996

[51] Int. Cl.$^6$ .......... G01Q 1/34

[52] U.S. Cl. .......... 343/709; 343/720

[58] Field of Search .......... 343/709, 710, 343/704, 720, 765, 890; H01Q 1/34

[56] References Cited

U.S. PATENT DOCUMENTS

| | | | |
|---|---|---|---|
| 2,658,143 | 11/1953 | Fiet et al. | 343/704 |
| 3,911,441 | 10/1975 | Stein | 343/709 |
| 5,128,688 | 7/1992 | West | 343/709 |

*Primary Examiner*—Michael C. Wimer

*Attorney, Agent, or Firm*—Michael J. McGowan; Robert W. Gauthier; Prithvi C. Lall

[57] ABSTRACT

A support base fabricated with a heat exchanger for use in supporting an antenna mast which contains heat generating electronic components. The base is attached to the faired mast of a submarine and the mast structure is attached to the support base. A cooling fluid is circulated through passageways within the mast adjacent to the electronic components to remove excess heat. The passageways are connected to the heat exchanger within the base. The heat exchanger consists of heat conductive exterior outer walls and an internal partition spaced inwardly from the outer wall forming a reservoir on the interior of the partition. The heated cooling fluid circulates through a serpentine passageway formed between the outer wall and the inner partition. Heat is dissipated through the outer wall into the surrounding medium. The passageway opens into the reservoir where the cooled fluid is returned to the electronic components. A watertight conduit is placed within the support for the passage of wiring to the electronic components. The seal between the mast and the support is also made watertight.

7 Claims, 1 Drawing Sheet

SUPPORT BASE FOR SUBMARINE ANTENNA MAST

STATEMENT OF GOVERNMENT INTEREST

The invention described herein may be manufactured and used by or for the government of the United States of America for governmental purposes without the payment of any royalties thereon or therefore.

BACKGROUND OF THE INVENTION (1) Field of the Invention

The present invention relates to submarine antennas, and deals more specifically with a cooling system provided in a support base for such an antenna to allow cooling of heat generating components in the antenna circuitry.

(2) Description of the Prior Art

Submarine antennas are used for communication and navigation purposes, and typically several different types of antennas are incorporated in a single mast which is affixed at its base to the submarine. See, for example, U.S. Pat. No. 4,030,100 issued to Perrotti. Multi-purpose antennas provided in a single mast of tear drop cross section are also shown in the prior art. See for example, U.S. Pat. Nos. 3,999,185 and 3,999,186 issued to Polgar, Jr. et al. and Majkrzak et al., respectively.

Present day submarine antenna systems capable of high data rates of production and processing require components which typically generate considerable heat, particularly those antenna systems capable of transmitting or receiving high frequency electromagnetic energy. The electronic components are typically located within the submarine such that the onboard electronics can be water or forced air cooled within the submarine. However, cabling necessary to transmit signals between the antenna and the onboard electronics exhibit unacceptable losses in signal strength. This situation has led to the need for locating at least some of the electronics and other data converting and amplification components in the antenna itself. The heat generated by certain components of submarine antenna systems can however limit use of the submarine's communication and navigation systems if heat generated within the antenna cannot be efficiently dissipated. The composite materials commonly used in the construction of the antenna mast exhibit poor heat conductivity and are adopted more for efficient size to strength ratio than for heat transfer characteristics. Withdrawing heat from the mast can therefor be difficult. Changing the material of the mast itself is not practical due to the requirements for the mast to be light in weight, small in cross sectional configuration, and yet remain capable of withstanding the rigors of wave action and the speed requirements of the submarine.

In order to avoid the operational limitations dictated by the relatively slow process of natural cooling in such a composite antenna, and to provide for more extended periods of use for these submarine systems, especially when the antenna is not immersed in sea water, but extends upwardly into the atmosphere, some form of liquid or heat exchange system would seem to be appropriate. See for example, U.S. Pat. No. 4,851,856 to Altoz, wherein an electronically steerable microwave antenna is cooled by pumping a cooling fluid between the individual transmit/receive modules through elongated hoses from a remote location or source of cooled fluid.

Altoz would suggest that fluid cooling lines or hoses must be provided from an onboard source of cooled fluid to carry off the excess heat generated in present day submarine antenna systems having amplification and data converting components of its antenna circuitry provided at the antenna itself. However, such a cooling system would require that fluid connections be provided through the pressure hull of the submarine, and could conceivably lead as well to excessive noise being generated. Noise is necessarily a situation that cannot be tolerated aboard a tactical submarine as excessive noise will limit a submarine's operational capability and interfere with the submarine's ability to carry out its assigned mission.

SUMMARY OF THE INVENTION

Accordingly, it is the chief object of the present invention to provide an effective heat exchange capability entirely within the confines of the antenna mast structure.

It is another object of the heat exchanger of the present invention to provide adequate support to the mast structure. A further object is that the heat exchanger provide a passageway or conduit from the submarine to electronics components within the mast structure. A still further object is that the heat exchanger maintain the watertight integrity of the mast.

These and other objects are accomplished by locating a heat exchanger at the support base of the mast, between the mast structure and the faired mast, and taking advantage of the cool sea water at this location adjacent the submarine itself in order to cool the cooling fluid contained in a uniquely shaped reservoir built into this support base for the antenna.

More specifically, the support base has an outer wall of tear drop cross section that cooperates with an inner partition assembly to define a convoluted or serpentine shaped series of interconnected spiral loops. The warmed coolant fluid from the antenna mast enters this reservoir at the outboard end of the support base for the mast, and cool fluid leaves the reservoir at a point near the inboard end of the support base. The support base provides a structural surface for attaching the mast which can support axial and bending loads from the mast. A conduit is provided through the heat exchanger reservoir for passage of electronic cables. An o-ring connection between the mast and the support base provides a watertight connection. The connection of the support base to the faired mast of the submarine maintains the watertightness of the existing mast structure to faired mast connection.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
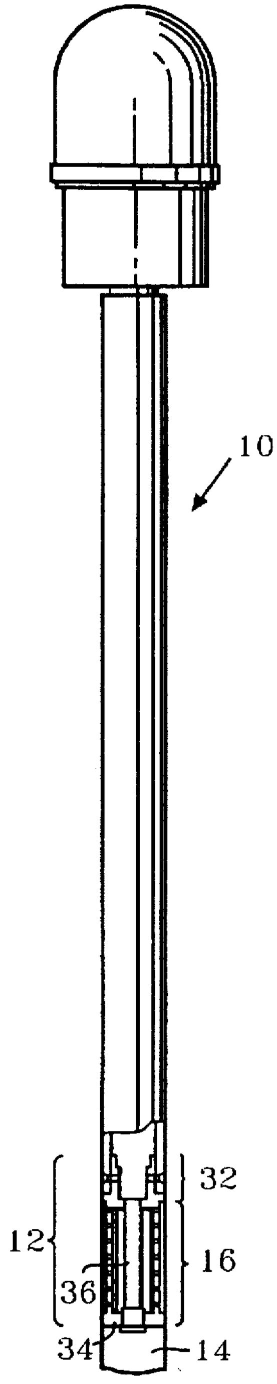
FIG. 1 is an elevational view of a submarine antenna fitted with a heated exchange support base constructed in accordance with the present invention.

Referring now to the drawings in greater detail, FIG. 1 illustrates a submarine antenna having heat generating components in its transmitting and receiving circuitry that are contained in the mast itself rather than being contained on board the submarine. The antenna mast structure indicated generally at 10, is fabricated from composite materials which are not readily adapted to draw the necessary amount of heat away from the electronic components contained therein. In accordance with the present invention, the composite mast structure 10 is mounted on a mast support or base 12, which base 12 is in turn supported by faired mast 14.

Conventional means are provided for circulating a cooling fluid to and from the various heat generating components within. the mast structure 10, and in accordance with the present invention, this cooling fluid is fed to and from a heat exchanger 16 within the mast support 12 through inlet and outlet ports associated with the heat exchanger all as described in greater detail hereinafter.

The mast support or base 12 may be fabricated in selected lengths to handle various heat loads depending upon the cooling requirements of the submarine systems which the heat exchanger will service. Lower cooling needs dictate a shorter length heat exchanger 16 while higher cooling loads require a somewhat longer heat exchanger 16. The materials for heat exchanger 16 are selected based upon their capability for conducting heat. Beryllium, copper or other heat conductive metals are the presently preferred materials for fabricating the mast support 12.

Figure 2:
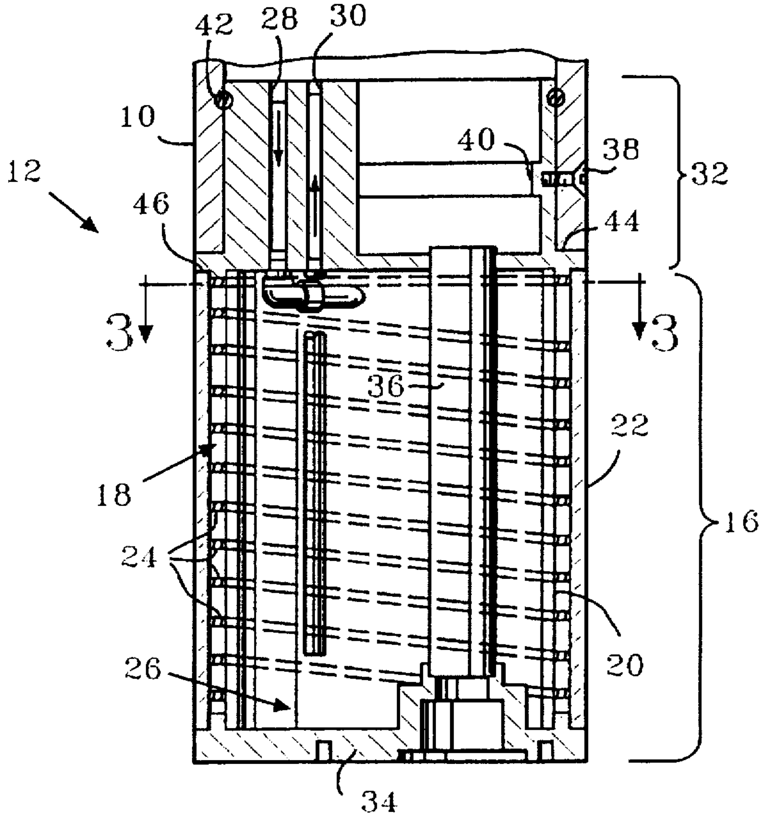
FIG. 2 is a detailed elevational view showing in vertical section the heat exchanger and support base for the antenna of FIG. 1.
Figure 3:
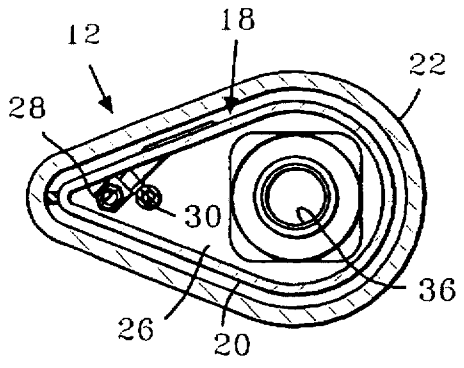
FIG. 3 is a horizontal sectional view taken on the line 3,3 of FIG. 2.

Referring now additionally to FIG. 2 and FIG. 3, an internal fluid passageway is provided in the heat exchanger 16 through which cooling fluid can be circulated to the mast, and more particularly to the components therein which require cooling. Preferably, and as best shown in FIG. 2, this internal fluid passageway is more particularly defined by an internal partition means 20 that is spaced inwardly of the outer wall portion 22 of heat exchanger 16. This internal partition means 20 further includes axially-spaced and inclined convoluted walls 24 that cooperate with one another to define serpentine shaped passageway 18 that is advantageously defined on one side by the outer wall 22 of the mast support 12, and on the other side by the partition wall 20. An opening (not shown) is provided in partition wall 20 such that passageway 18 is in fluid communication with reservoir 26. Reservoir 26 is defined by the interior surface of partition wall 20 and serves to contain the cooling fluid. The reservoir 26 and passageway 18 define an efficient heat exchanger capable of cooling the fluid that has been heated by the components within the mast 10. Because it is intended that heat from the cooling fluid be carried through outer wall 22 into the surrounding medium, partition means 20 is preferably fabricated from a stainless steel or other material of equivalent low heat conductivity. In this way, undesirable heat transfer through partition wall 20 to the fluid in reservoir 26 is minimized.

Inlet and outlet ports are provided in the mast support structure as indicated generally at 28 and 30, respectively, so as to provide a convenient means for fluidly connecting heat exchanger 16 to the various lines (not shown) that circulate the cooling fluid to and from the components requiring heat extraction. Preferably, and as shown in FIG. 2, the reservoir inlet and outlet ports 28 and 30 are located adjacent the upper section 32 of the mast support 12 and the base 34, respectively, to ensure that the warm cooling fluid returned to the reservoir is not located adjacent the cooled fluid leaving the reservoir.

As so constructed and arranged, the serpentine passageway 18 can be more particularly described as comprising a convoluted series of interconnected spiral loops, each of distorted shape, so as to fit within the confines of the faired tear drop shaped mast support 12. This faired tear dropped shape is shown in FIG. 3. The cross section shows a relatively large radius of curvature at the leading edge and a smaller radius of curvature at the trailing edge, and with relatively straight sides provided tangent to these leading end trailing edge radii in order to assure minimum drag of the mast 10 and support 12 as they travel through the sea. The tear drop shape also assures a relatively large heat exchange area for the cooling fluid. Thus, the relatively low temperature of sea water surrounding the mast 10 generally can be used to take away the heat absorbed by the cooling fluid through the heat conductive metal outer wall portion 22 of the heat exchanger 16.

With reference to FIG. 3, the tear drop shaped mast cross section is further characterized by an axially extending conduit 36 which is located generally at the center of the leading edge radius of the mast support 12. This conduit provides a path for cables or conductive leads that interconnect the circuitry contained in the antenna mast 10 with the onboard equipment within the submarine (not shown).

In summary, the mast support or base 12 provides a convenient attachment point for the mast antenna system 10. Since under normal operating conditions, the faired mast 14 is always submerged, attachment of the heat exchanger 16 of base 12 at this location provides maximum cooling for the components in the mast system. Although these heat generating components may be located well above the sea surface, they are nevertheless cooled efficiently by the unique mast base 12 with its associated heat exchanger 16.

The mast support or base 12 not only affords a structure that serves as a heat exchanger, but such structure also affords electrical connections, through conduit 36, to provide power, radio frequency signals, and other signals to and from the electronic components required in the mast antenna 10. Conduit 36 provides a dry path to and from the electronics within the mast 10. This conduit may be brazed or welded to the tank base 34 and to the upper section 32 of the mast support 12.

As shown clearly on FIG. 2, upper section 32 is fitted to the composite mast structure 10. This upper section 32 performs a variety of functions including that which allows the mast antenna structure 10 to be attached to the support 12. Screws 38 are provided in the mast 10 so as to be received into the boss 40 defined by this upper section 32. An O-ring 42 may also be provided to maintain water tight integrity for the interior of the mast structure 10. The mast structure 10 rests on a flat surface 44 just above the outer wall 22 of the heat exchange portion 16 of the mast support 12. This configuration allows the weight of the mast 10 and also hydro-static pressure forces to be transferred to the outer wall 22 of the support 12 instead of being transmitted to the mounting screws 38. The upper section 32 is long enough so that the walls 22 take all the bending loads. Finally, the upper section 32 also serves as a structural support for the internal mast components themselves. This allows ready access for disassembly and assembly of the mast structure 10 by removing the support 12 from the mast 10. Inlet and outlet coolant ports 28 and 30 pass through upper section 32 as shown.

In operation, coolant fluid flows from the inlet port 28, through distorted spiral passageway 18, to the base 34 of the heat exchanger 16 and into reservoir 26. The stainless steel inner wall 20 acts as a heat insulator between passageway 18 and reservoir 26 because stainless steel does not conduct heat readily. The coolant in the internal reservoir 26 can thus be held at a proper temperature to serve as the source of cooling fluid for electronic components within mast 10. Using this cooling fluid to maintain electronic components at reduced temperatures allows for reduced power to be expended during operational situations when the mast is raised completely out of the water or when the submarine is dock side.

The heat exchanger 16 is designed to be easily assembled, such as by welding or brazing of the various metal components including the conduit 36 fitted to the base 34 as shown. The base 34 is welded to the outer wall 22, and the partition wall 20, with inclined walls 24 attached, is connected to the upper section 32 with inlet cooling port 28 welded to the partition wall 20. Outlet port 30 is welded to the upper section 32. Upper section 32 with its tank partition wall 20 and inclined wall 24 is then lowered into the outer wall 22 where a final weld 46 completes the construction of the support 12.

The mast support 12 described above supports the mast 10, which has internal cooling fluid lines conventionally provided therein to carry cooling fluid to and from the various heat generating components inside the mast 10. A conventional pump (not shown) may be provided in the mast to provide the desired flow of cooling fluid between the mast 10 and the ports 28 and 30 at the mast support 12.

Obviously, many modifications and variations of the present invention may become apparent in light of the above teachings. For example, the shape of the passageways and the cooling path could be varied from that shown. The inner wall of the heat exchanger could incorporate an insulating material, if the heat transfer through the wall became excessive. Also, antenna masts vary in size, both in cross-sectional size and in length. Consequently, cooling requirements can vary as well. The present invention contemplates varying the length and/or the cross-sectional size of the mast support to meet such additional cooling requirements.

In light of the above, it is therefore understood that within the scope of the appended claims, the invention may be practiced otherwise than as specifically described.

What is claimed is:

1. A support for a submarine antenna mast having heat generating components of transmitting and receiving circuitry contained in the mast itself, the support comprising:

an upper portion secured to the mast;

a base secured to a faired mast portion of the submarine;

an internal partition spaced inwardly from an outer wall of an intermediate portion, the intermediate portion being located between said upper portion and said base, said internal partition defining a reservoir within said internal partition; and internal fluid passageways defined within the space between the outer wall and the internal partition, said passageways for circulating a cooling fluid between said reservoir and said heat generating components for cooling the same.

2. The support according to claim 1, wherein the passageways further comprise a serpentine passage having a beginning at a first end of the intermediate portion nearest the upper portion, said beginning receiving the cooling fluid returning from the heat generating components, the serpentine passage winding in a spiral fashion about the internal partition and having an ending at a second end of the intermediate portion nearest the base, said ending being in fluid communication with the reservoir, the cooling fluid being cooled in circulating through said serpentine passage.

3. The support according to claim 1, further comprising a conduit disposed within said support, said conduit providing a path for the passage of conductive leads from the submarine to the heat generating components in the mast.

4. The support according to claim 1, wherein:

said outer wall is fabricated from a heat conducting metal material; and said internal partition is fabricated from a material having a much lower heat conductivity than the material of the outer wall.

5. The support of claim 2, wherein said upper portion further comprises:

an inlet port in fluid communication with said fluid returning from the components, the fluid flowing through said inlet port to the beginning of said serpentine passage; and an outlet port in fluid communication with the reservoir, the cooling fluid flowing from the reservoir, through the outlet port and returning to said components.

6. The support according to claim 1, the upper portion further comprising a protruding portion, the protruding portion being inset from the exterior dimensions of the upper portion, the inset forming a step on the upper portion, the protruding portion extending within a shell portion of the mast, the step supporting a lower surface of the shell portion of the mast.

7. The support according to claim 6, wherein screw means extend through the shell portion into the protruding portion to secure the mast to the support.

* * * * *